(12) United States Patent
Ishihara et al.

(10) Patent No.: US 7,848,050 B2
(45) Date of Patent: Dec. 7, 2010

(54) POSITIONING CONTROL SYSTEM AND METHOD THEREFOR

(75) Inventors: Yoshiyuki Ishihara, Kawasaki (JP); Shinji Takakura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/393,260

(22) Filed: Feb. 26, 2009

(65) Prior Publication Data
US 2009/0219646 A1 Sep. 3, 2009

(30) Foreign Application Priority Data
Feb. 28, 2008 (JP) ............... 2008-048241

(51) Int. Cl.
*G11B 5/596* (2006.01)
(52) U.S. Cl. ............... 360/77.02; 360/77.04; 360/77.08
(58) Field of Classification Search .................. None
See application file for complete search history.

(56) References Cited

U.S. PATENT DOCUMENTS

| | | | |
|---|---|---|---|
| 6,153,998 A | 11/2000 | Takakura | |
| 7,576,943 B2 * | 8/2009 | Atsumi et al. | 360/78.04 |
| 2002/0089778 A1 * | 7/2002 | Shimokoshi et al. | 360/77.02 |
| 2002/0093754 A1 * | 7/2002 | Zhang et al. | 360/77.04 |

FOREIGN PATENT DOCUMENTS

JP 2004-178662 6/2004

OTHER PUBLICATIONS

Venkataramanan et al, Discrete-Time Composite Nonlinear Feedback Control with an Application in Design of a Hard Disk Drive Servo System, IEEE Transactions on Control Systems Technology, vol. 11, No. 1, Jan. 2003.

* cited by examiner

*Primary Examiner*—Andrew L Sniezek
(74) *Attorney, Agent, or Firm*—Turocy & Watson, LLP

(57) ABSTRACT

There is provided with a positioning control system which includes: a head moving unit configured to move a head for recording or reproducing information with respect to a disk capable of recording information; a position detecting unit configured to detect a position of the head; an error detecting unit configured to detect a position error signal of a detected head position with respect to a predetermined target position; a compensation controller configured to generate control input by performing phase lead compensation and phase delay compensation for the position error signal and supply the control input to the head moving unit; and a gain controller configured to control at least one of gains the phase lead compensation and the phase delay compensation based on frequency components contained in the position error signal and an amplitude of the position error signal.

4 Claims, 13 Drawing Sheets

CONTROLLED OBJECT MODEL FREQUENCY RESPONSE

FREQUENCY RESPONSE OF PID CONTROLLER AND OPEN LOOP

FREQUENCY RESPONSE OF INTEGRAL COMPENSATOR
AND PHASE LEAD COMPENSATOR

CHARACTERISTICS OF VARIABLE PHASE LEAD COMPENSATOR WHEN ρ=0

CHARACTERISTICS OF VARIABLE PHASE LEAD COMPENSATOR WHEN ρ=1

VARIATION OF CONTROLLER FREQUENCY RESPONSE

VARIATION OF SENSITIVITY FUNCTION

VARIATION OF FREQUENCY RESPONSE OF VARIABLE PHASE LEAD COMPENSATOR (TRANSFER FUNCTION TYPE)

CHARACTERISTICS OF CONTROLLED OBJECT MODEL THAT TAKES VARIATION INTO CONSIDERATION

DISTURBANCE SIGNAL TIME SERIES

DISTURBANCE SIGNAL SPECTRUM DISTRIBUTION

FREQUENCY RESPONSE OF FILTER F(z)

COMPARISION OF POSITIONING ACCURACY

POSITIONING CONTROL SYSTEM AND METHOD THEREFOR

CROSS REFERENCE TO RELATED APPLICATIONS

This application is based upon and claims the benefit of priority from the prior Japanese Patent Applications No. 2008-48241, filed on Feb. 28, 2008; the entire contents of which are incorporated herein by reference.

BACKGROUND OF THE INVENTION

1. Field of the Invention

The present invention relates to a head positioning control system for a magnetic disk device and a method for the same.

2. Related Art

In a head positioning control system of a magnetic disk device, control for making the head follow the same track is called following (or tracking) control. A basic structure of a typical following control system includes a feedback controller for calculating control input from a detected position error signal and a resonance filter for preventing the control system from being unstable due to machine resonance excitation of head gimbal assemblies (e.g., an arm and a suspension). Conventional design methods for feedback controllers employ PID control (phase lead/delay compensation), LQG control, H∞ control, and so forth. In principle, however, many of such methods reduce to a linear feedback controller that combines an integral element for low-frequency compensation, phase lead compensation for securing stability margin, and a resonance stabilizing element having a notch filter shape (for example, see JP-A 2006-79670 (Kokai), JP-A 2006-179185 (Kokai), Hirata, Ryu, et al., "Head positioning control for a hard disk using H∞ control theory", Transactions of the Society of Instrument and Control Engineers, Vol. 29, No. 1, pp. 71-77, (1998)).

Since making the capacity of a magnetic disk large requires making a track pitch be of high density, performance improvement of a following control system that governs the accuracy of head positioning is a critical issue.

The accuracy of head positioning of a following control system is determined by how a sensitivity function of the feedback control system is shaped. In design of a general control system, sensitivity for a frequency band in which disturbance (which is primarily low-frequency disturbance sufficiently lower than a crossover frequency (a frequency at which a sensitivity function intersects the 0 dB line)) is significant should be reduced. In a head positioning control system of a magnetic disk, however, DC, torque disturbance, low-order RRO disturbance or the like exist in lower frequency bands, flutter disturbance exists around the crossover frequency, and mechanical resonance disturbance due to windage exists in higher frequency bands, meaning that disturbance is distributed across a wide band. Thus, with a conventional linear feedback controller, tradeoff of control performance caused by waterbed phenomenon of the sensitivity function is inevitable and limit of control performance is fixed.

SUMMARY OF THE INVENTION

According to an aspect of the present invention, there is provided with a positioning control system, comprising:

a head moving unit configured to move a head for recording or reproducing information with respect to a disk capable of recording information;

a position detecting unit configured to detect a position of the head;

an error detecting unit configured to detect a position error signal of a detected head position with respect to a predetermined target position;

a compensation controller configured to generate control input by performing phase lead compensation and phase delay compensation for the position error signal and supply the control input to the head moving unit; and a gain controller configured to control at least one of gains the phase lead compensation and the phase delay compensation based on frequency components contained in the position error signal and an amplitude of the position error signal.

According to an aspect of the present invention, there is provided with a positioning control method, comprising:

moving a head for recording or reproducing information with respect to a disk capable of recording information;

detecting a position of the head;

detecting a position error signal of a detected head position with respect to a predetermined target position;

generating control input of the head by performing phase lead compensation and phase delay compensation for the position error signal and supplying the control input to the head; and controlling at least one of gains of the phase lead compensation and the phase delay compensation based on frequency components contained in the position error signal and an amplitude of the position error signal.

DETAILED DESCRIPTION OF THE INVENTION

Embodiments of the present invention will be described below with reference to drawings.

Figure 3:
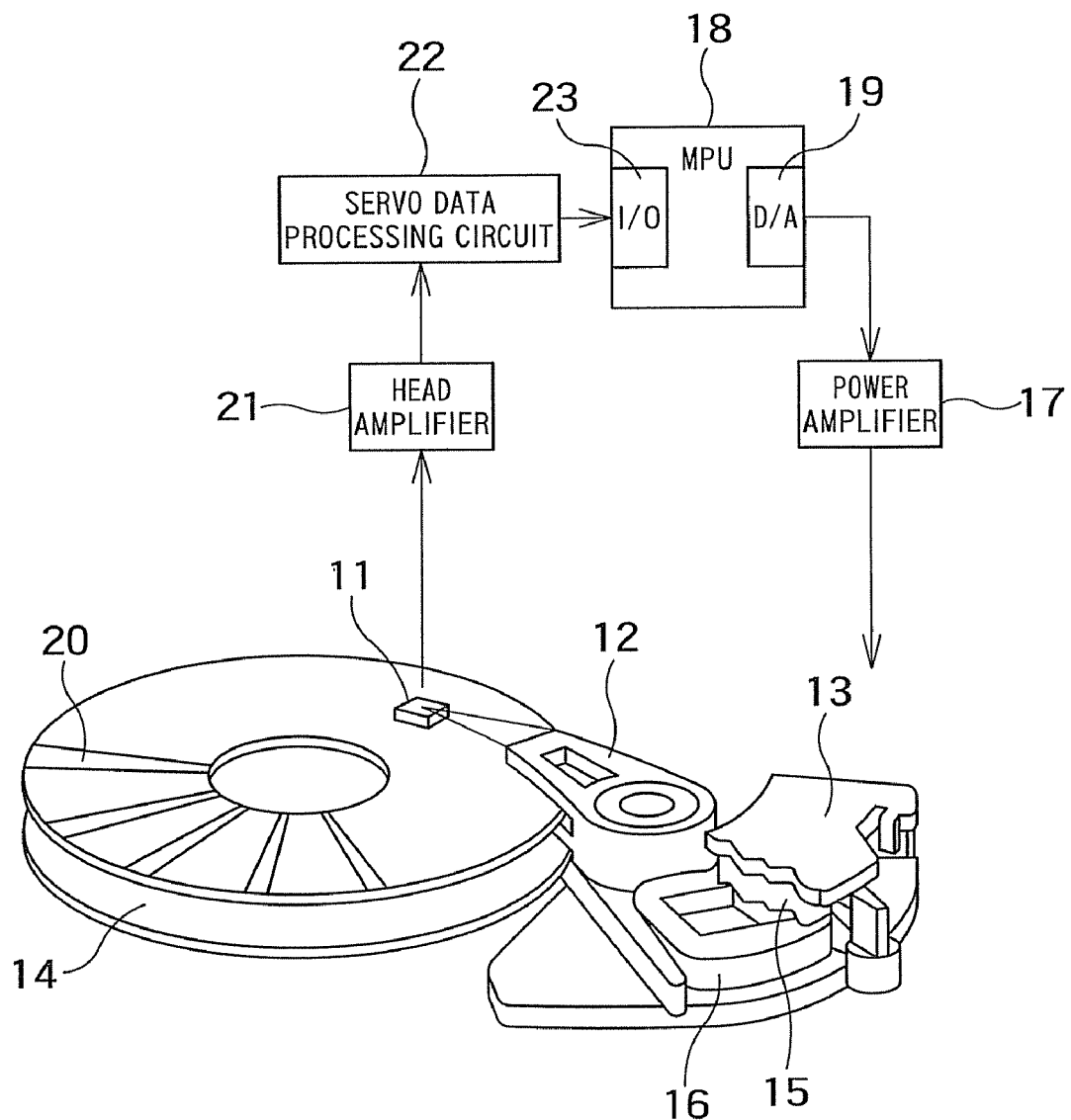
FIG. 3 shows a magnetic disk device according to an embodiment of the present invention.

FIG. 3 generally shows the configuration of a magnetic disk device having a head positioning control system as an embodiment of the present invention. The magnetic disk device includes a microprocessor (Micro-Processor Unit or MPU) 18 as a primary component, and the head positioning control system as an embodiment of the invention can be implemented as software in the MPU 18.

A head 11 is supported on an arm 12. The arm 12 moves the head 11 in the radial direction of a magnetic disk 14, which is capable of magnetically recording information, with driving force from a voice coil motor or VCM 13. The arm 12 and the VCM 13 correspond to a moving unit for moving the head 11, for example.

The VCM 13 has a magnet 15 and a driving coil 16 and is driven with electric current supplied from a power amplifier 17.

The MPU 18 converts control input derived by calculation to an analog signal through a D/A converter 19 and supplies it to the power amplifier 17.

The power amplifier 17 converts the control input supplied from the MPU 18 into driving current and supplies it to the VCM 13.

One or more disks 14 are provided and rotated at a high speed by a spindle motor (not shown). On the disk(s), a plurality of tracks are concentrically formed and servo areas (servo sectors) 20 are provided in the tracks at regular intervals. In the servo areas 20, information on the positions of the tracks is embedded in advance. The position information is read through the head 11 by the head 11 crossing the servo areas 20, and a signal that represents the position information is amplified in the head amplifier 21 and supplied to a servo data processing circuit 22.

The servo data processing circuit 22 generates servo information from the amplified signal and outputs the information to the MPU 18 at regular time intervals.

The MPU 18 calculates head position from the servo information taken by an I/O 23 and calculates control input to be supplied to the VCM based on the head position calculated and a target head position (a target position) at regular time intervals. The MPU 18 has a position detecting unit for detecting the position of the head.

Before discussing the details of the positioning control system according to the embodiments of the invention, technical background of how the present invention was made by the inventors is described.

Figure 20:
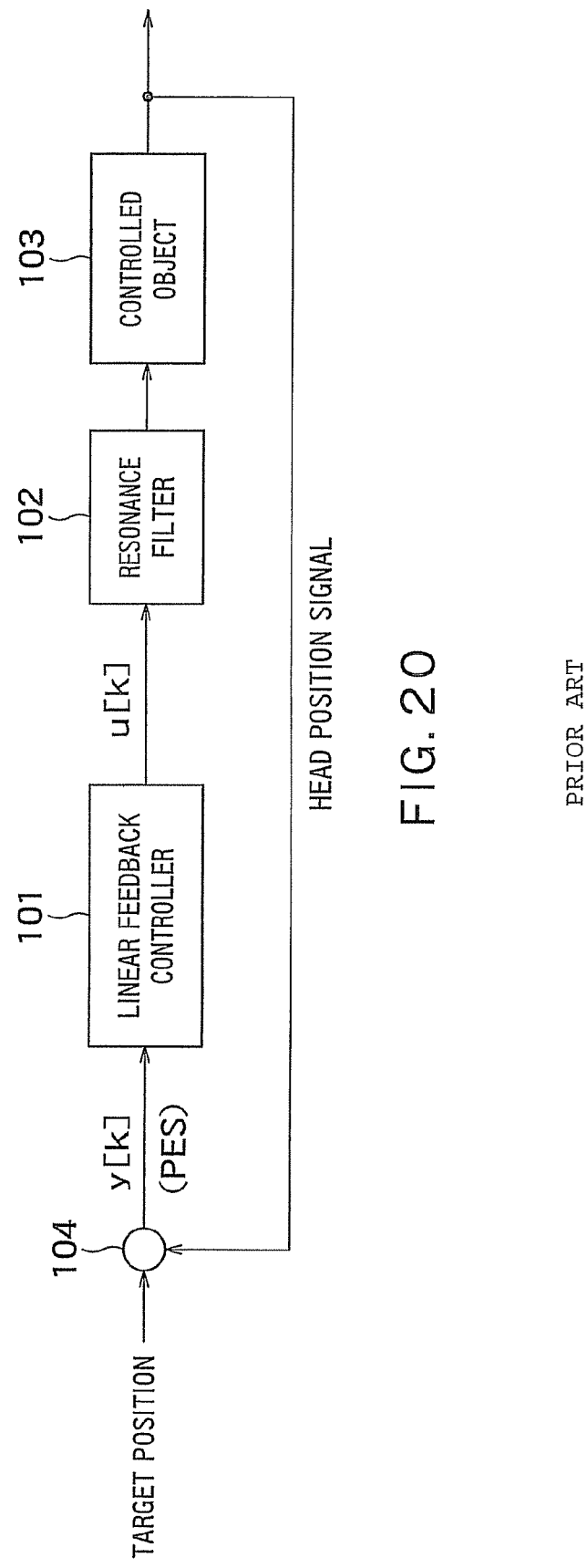
FIG. 20 shows the structure of a conventional following control system.

FIG. 20 shows a basic structure of general following (or tracking) control (a conventional positioning control system). Following control as called herein refers to control for having a head follow the same track. It is also assumed that the head positioning control system is realized as a digital control system based on the microprocessor 18 and thus is composed of a discrete time control system.

Transfer characteristics from the VCM (voice coil motor) to the head position is a controlled object 103, and an observed signal for a feedback system is head position signal. A position error signal (PES), y[k], indicative of the head position with respect to the center of a target track (a target position) is detected by an error detecting unit 104 and input to a linear feedback controller 101. Because this is following control, the target position is fixed. The liner feedback controller 101 has a phase delay compensator for low-frequency compensation (an integral element) and a phase lead compensator for securing stability margin (a proportional element and a differential element), which are both general.

The linear feedback controller 101 compensates the inputted position error signal y[k] for phase delay and lead to generate control input u[k], and inputs u[k] to a resonance filter 102. The resonance filter 102 removes components corresponding to resonance frequencies contained in the controlled object 103 from the control input signal. This prevents the control system from getting unstable due to machine resonance excitation of head gimbal assemblies (e.g., an arm and a suspension).

The control input signal after removal of components corresponding to resonance frequencies with the resonance filter is supplied to the controlled object 103, thereby controlling the head position. An observed signal for the feedback system (the head position signal) is detected from the controlled object 103 and input to the error detecting unit 104.

Figure 17:
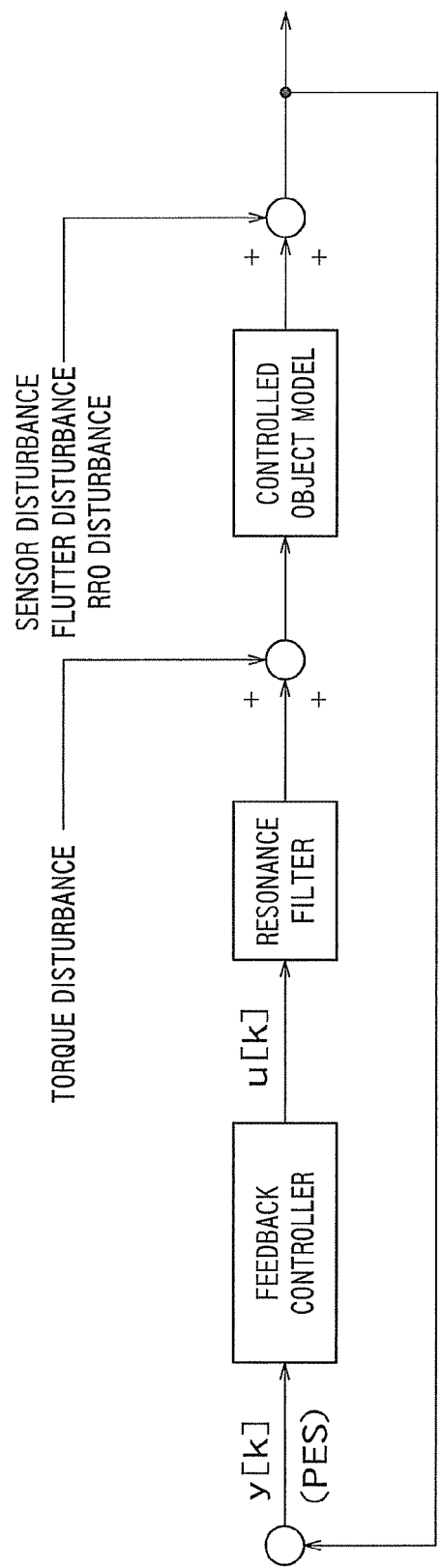
FIG. 17 is a block diagram of simulation of a positioning control system according to an embodiment of the invention.

In a head positioning control system of a magnetic disk device, DC, torque disturbance, low-order RRO disturbance or the like exist in lower frequencies, flutter disturbance exists in midrange frequencies (around the crossover frequency of the sensitivity function (i.e., a frequency at which the sensitivity function intersects the 0 dB line), and further mechanical resonance disturbance caused by windage exists in higher frequencies, meaning disturbance is distributed over a wide band. Such wide distribution of disturbance is shown in FIG. 2(B). Such disturbances significantly affects the accuracy of head positioning by getting into the control input signal at the output of the resonance filter 102 and/or getting into the head position signal at the output of the controlled object 103 (see FIG. 17). With such wide distribution of disturbance, the accuracy of head positioning is determined by how the sensitivity function of the feedback controller is shaped.

Figure 2A:
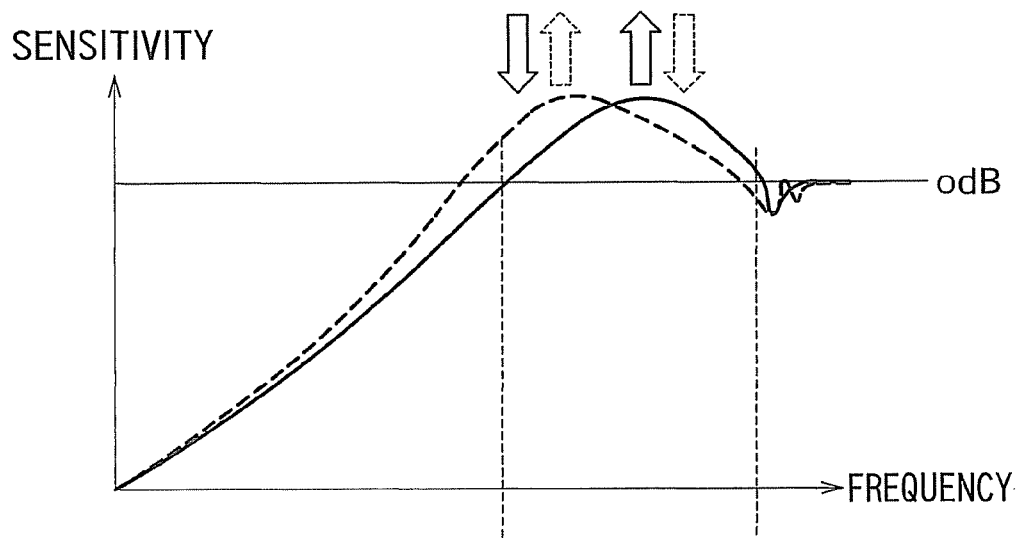
FIGS. 2A and 2B schematically show sensitivity functions and disturbance distribution.
Figure 2B:
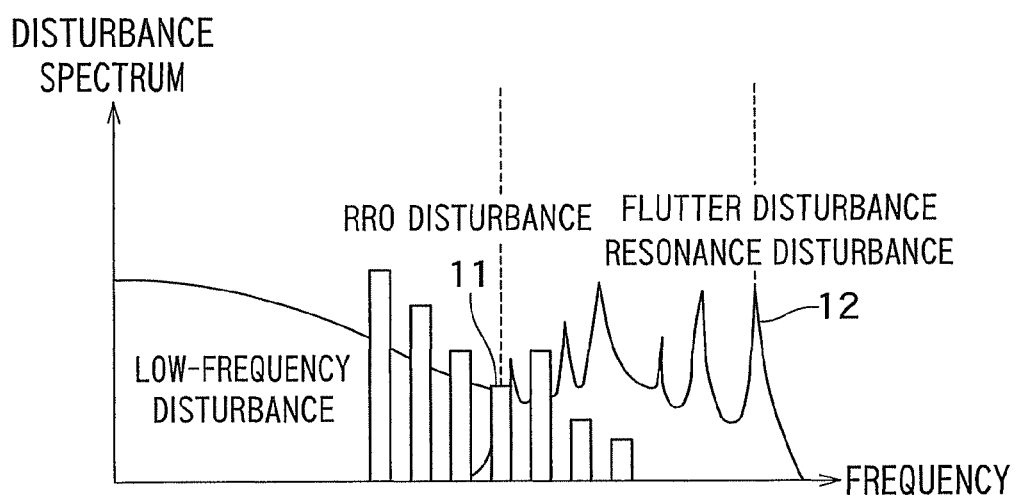

FIG. 2(A) shows two examples of the sensitivity function. The sensitivity function shows how much effect disturbance will have on the position error signal (PES). Disturbance is suppressed as it is farther downward from the 0 dB line and is increased as it is farther upward from the 0 dB line. At 0 dB, disturbance is given to a signal as it is.

In design of a general control system, sensitivity for a frequency band in which disturbance (which is mainly low-frequency disturbance sufficiently lower than the crossover frequency) is significant should be reduced. On the other hand, disturbance is distributed across a wide band in the head positioning control system of a magnetic disk device also as shown in FIG. 2(B). Thus, with the conventional linear feedback controller shown in FIG. 20, tradeoff of control performance due to waterbed phenomenon of the sensitivity function would be unavoidable and limit of control performance would be fixed. For example, the sensitivity function shown by the solid line in FIG. 2(A) can effectively suppress disturbance shown by reference numeral 11 in FIG. 2(B), whereas disturbance shown by reference numeral 11 will be conversely increased with the sensitivity function shown by a dotted line. On the other hand, the sensitivity function shown by the dotted line can effectively suppress the disturbance shown by reference numeral 12 in FIG. 2(B), but the disturbance of reference numeral 12 will be conversely increased with the solid-line sensitivity function.

Against such technical background, the inventors have found through consideration a solution of shaping the sensitivity function so that it positively suppresses disturbance by varying control gain in accordance with disturbance condition, thereby mitigating tradeoff of control performance due to disturbance distribution across a wide band. The positioning control system according to the embodiments of the present invention is described in detail below.

Figure 1:
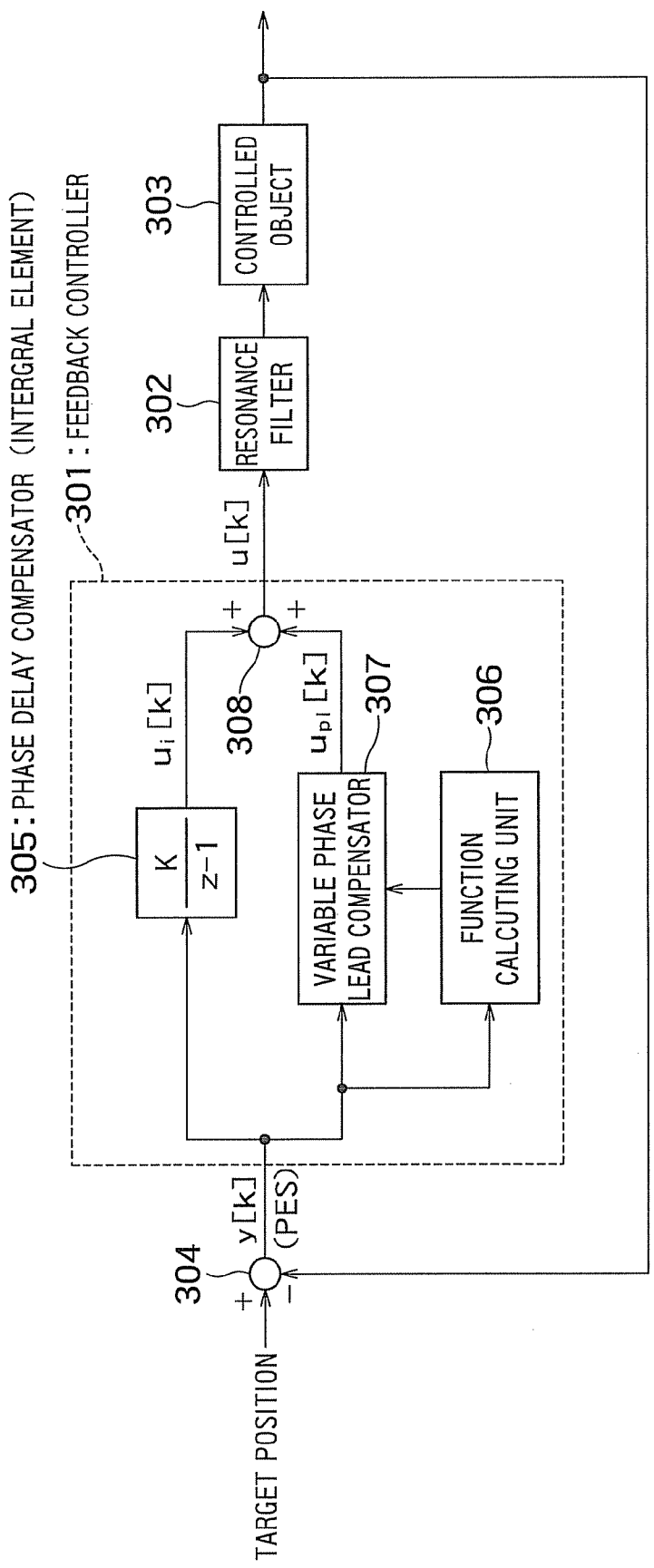
FIG. 1 shows a positioning control system as an embodiment of the present invention.

FIG. 1 shows a basic structure of a following control system (a positioning control system) as an embodiment of the present invention which varies control gain in accordance with disturbance condition. Because the head positioning control system of a magnetic disk device is a digital control system based on the microprocessor 18, the following control system of FIG. 1 is assumed to be composed of a discrete time control system.

The following control system of FIG. 1 includes a feedback controller 301, a resonance filter 302, a controlled object 303, and an error detecting unit 304.

The feedback controller 301 includes an integral element (or a phase delay compensator) 305, a variable phase lead compensator 307, a function calculating unit 306, and an adding unit 308.

The integral element (the phase delay compensator) 305, variable phase lead compensator 307, and adding unit 308 constitute a compensation controller. The function calculating unit 306 corresponds to a gain controller, for example.

As the resonance filter 302, controlled object 303, and error detecting unit 304 are similar to the resonance filter 102, controlled object 103, and error detecting unit 104 of FIG. 20, detailed description of them is omitted.

The integral element (phase delay compensator) 305 compensates a position error signal (PES) y[k] from the error detecting unit 304 for phase delay, and outputs a signal after phase delay compensation, $u_i[k]$.

The variable phase lead compensator 307 compensates the position error signal (PES) y[k] from the error detecting unit 304 for phase lead and outputs a signal after phase lead compensation, $u_{pl}[k]$.

The adding unit 308 adds the output signal from the integral element (phase delay compensator) 305 and the output signal from the variable phase lead compensator 307, and outputs the sum as control input, u[k].

While a configuration in which the integral element (phase delay compensator) 305 and the variable phase lead compensator 307 are connected in parallel is shown here, the integral element (phase delay compensator) 305 and the variable phase lead compensator 307 may also be cascade-connected and a signal that has passed through the integral element (phase delay compensator) 305 and the variable phase lead compensator 307 may be output as the control input, u[k].

The function calculating unit 306 controls the gain of the phase lead compensator 307 (i.e., gain of phase lead compensation) based on the frequency components contained in the position error signal y[k] and the amplitude of the position error signal y[k]. More specifically, the function calculating unit 306 continuously varies the controller operation coefficient (i.e., gain) of the variable phase lead compensator 307 which adjusts the stability margin in higher frequencies based on the position error signal (PES) y[k] and a function ρ(y) (see FIG. 4 discussed below). This is a major difference from the following control system of FIG. 20 and is a significant characteristic of the present embodiment. The reason to thus vary the gain of the variable phase lead compensator 307 is that the phase lead compensator is responsible for adjusting gain and phase in the vicinity of the crossover frequency, which is important in shaping of the sensitivity function. The gain of the phase delay compensator 305 may also be varied in a similar way, which can shape the sensitivity function as well. Therefore, the present invention is intended to encompass a configuration that varies the gain of the phase delay compensator 305 (i.e., the gain of phase delay compensation) based on the position error signal (PES) y[k] and the function ρ(y).

For the function ρ(y), such a function may be selected, for example, that sets the controller gain so that the sensitivity function shown by the solid line in FIG. 2(A) is obtained when frequency components of low-frequency disturbance (e.g., low-order RRO disturbance) are large in the position error signal in a certain sampling time, sets the controller gain so that the dotted-line sensitivity function is obtained when frequency components of high-frequency disturbance are large, and sets the controller gain so that the sensitivity function continuously varies between the two sensitivity functions for disturbance in between the low and high frequency components. As a result, it is possible to improve performance of suppressing high-frequency disturbance such as flutter and resonance and, furthermore, performance of suppressing disturbance near the crossover frequency while maintaining the performance of suppressing low-frequency disturbance, as compared to a conventional feedback controller with one fixed sensitivity function (e.g., the solid-line sensitivity function).

The detailed configuration of the feedback controller 301 of the present invention will be described below as first and second embodiments.

First Embodiment

Figure 4:
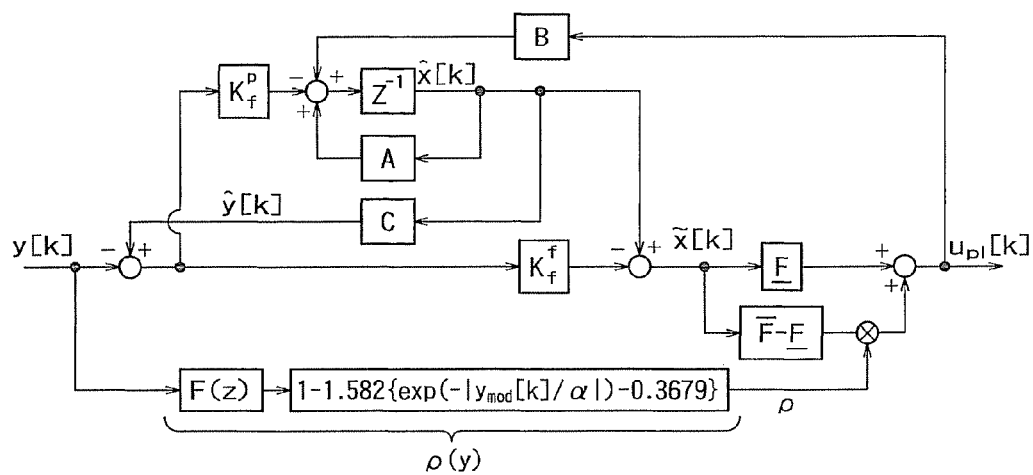
FIG. 4 is a block diagram of a variable phase lead compensator (state space type) and a function calculating unit according to an embodiment of the invention.

FIG. 4 shows a configuration using a state space structure as an example of the configuration of the variable phase lead compensator 307 and function calculating unit 306 of the feedback controller 301 of FIG. 1. Specifically, the configuration of FIG. 4 includes a state estimator for estimating head speed from a head position error signal and control input, variable state feedback gain, and a function calculating unit (ρ(y)) that performs processing relating to the function ρ(y) which determines the variable state feedback gain.

Shown below are a state space representation of the state estimator and state feedback, and a function "ρ". $\tilde{x}[k]$ is an estimated value of a state variable and is a vector including the estimated value of head position and the estimated value of head speed. "F" is state feedback gain and corresponds to the proportional and differential gains of the phase lead compensator.

1. State Estimator Updating Formula $$\hat{x}[k+1]=A\hat{x}[k]+Bu_{pl}[k]-K_f^p(C\hat{x}[k]-y[k])$$

$$\tilde{x}[k]=\hat{x}[k]-K_f^f(C\hat{x}[k]-y[k])$$ [Formula A]

2. Control Input (State Feedback)

$$u_{pl}[k]=-F\tilde{x}[k]$$

$$F=\underline{F}+\rho(\overline{F}-\underline{F})$$ [Formula B]

3. Function "ρ"

$$y_{mod}[k]=F(z)y[k]$$

$$\rho=1-1.582\{\exp(-|y_{mod}[k]/\alpha|)-0.3679\}$$ [Formula C]

Formulas A and B represent state feedback control using a filter-type state estimator (an observer), having a different state estimator structure from Formula D, which is general observer-combined state feedback control.

$$\hat{x}[k+1]=A\hat{x}[k]+Bu[k]-K_f^p(C\hat{x}[k]-y[k])$$

$$u[k]=-F\hat{x}[k] \quad \text{[Formula D]}$$

A head positioning control system for a magnetic disk device requires a controller that has relatively high gain up to the vicinity of Nyquist frequency. However, if Formula D is used, high frequencies of an open loop system will roll off and sufficient phase margin cannot be secured. To avoid this, the gain and phase margin of the open loop system are secured using discrete system loop transfer recovery by means of Formula A.

Formula B basically represents state feedback control based on a state estimation value $\tilde{x}$ estimated by Formula A, but is designed to vary state feedback gain in accordance with "ρ" calculated by Formula C.

$\underline{F},\overline{F}$ in Formula B are state feedback gains as of when "ρ" is upper and lower limits within a certain variation width. Here, if Formula C changes with:

$$0 \leq \rho \leq 1$$

it is obvious that, when "ρ" is the lower limit value of 0, Formula B becomes:

$$u_{pl}[k]=-\underline{F}\tilde{x}[k] \quad \text{[Formula F]}$$

and when "ρ" is the upper limit value of 1, Formula B becomes:

$$u_{pl}[k]=-\overline{F}\tilde{x}[k]$$

Thus, by designing the two state feedback gains $\underline{F},\overline{F}$ in advance so that a desired sensitivity function shape is obtained, the shape will continuously vary between the two sensitivity functions through variable state feedback control by Formula B.

As the policy of designing $\underline{F},\overline{F}$, if $\underline{F},\overline{F}$ are designed such that the dotted-line sensitivity function shape is obtained as shown in FIG. 2(A) when ρ=0 and F=$\underline{F}$, and the solid-line sensitivity function shape is obtained when ρ=1, F=F$\overline{F}$, performance of suppressing low- and high-frequency disturbances will be adjusted in accordance with the frequency components of the position error signal.

The value "ρ" in Formula C basically continuously varies as $0 \leq \rho \leq 1$ in accordance with the position error signal y[k] as mentioned above, and such a function is set as "ρ" that makes ρ→1 when the position error amplitude (the amplitude of the position error signal) is large (i.e., offtrack) and ρ→0 when the position error amplitude is 0 (i.e., at the track center). Formula C (the lower formula) is an example thereof and an arbitrary function may be selected as long as it is a monotonically increasing function. However, a monotonically decreasing function could be selected depending on the form of Formula B.

However, since the position error amplitude is caused by all disturbances in lower to higher frequencies (the position error amplitude would converge to zero assuming that there is no disturbance at all), the control system may change to such a sensitivity function shape as the one shown by the solid line in FIG. 2(A) when simply designed as described above if a position error amplitude is caused to make ρ→1 due to high-frequency disturbance, such as flutter and resonance, possibly degrading the accuracy of positioning instead.

Thus, the position error signal y[k] is filtered by an appropriately configured filter F(z) (a bandpass filter) so that "ρ" varies with a position error amplitude in the frequency components within a particular range (a predetermined band).

By way of example, if a low-pass filter is selected for F(z), then ρ→1 only when a large position error amplitude occurs due to low-frequency disturbance and/or low-order RRO components, and the sensitivity function changes to such a shape as shown by the solid line in FIG. 2(A). Conversely, when there is no low-frequency disturbance or low-order RRO components, then ρ→0 and the sensitivity function changes to such a shape as shown by the dotted line in FIG. 2(A), thus any high-frequency disturbance present can be suppressed. If both low-frequency disturbance and/or low-order RRO components and high-frequency disturbance are present, then ρ→1 and the sensitivity function changes to such a shape as shown by the solid line in FIG. 2(A) and performance of suppressing low-frequency disturbance and/or low-order RRO components is given higher priority.

In such a manner, frequency separation for suppressing performance for low- and high-frequency disturbances is carried out to mitigate the tradeoff of the sensitivity function, which is a problem with conventional feedback controllers (with fixed gain).

In the following, we show a design example of the feedback controller 301 according to the first embodiment that uses a mathematical model simulating the controlled object of a magnetic disk device (a voice coil motor or VCM).

Figure 5:
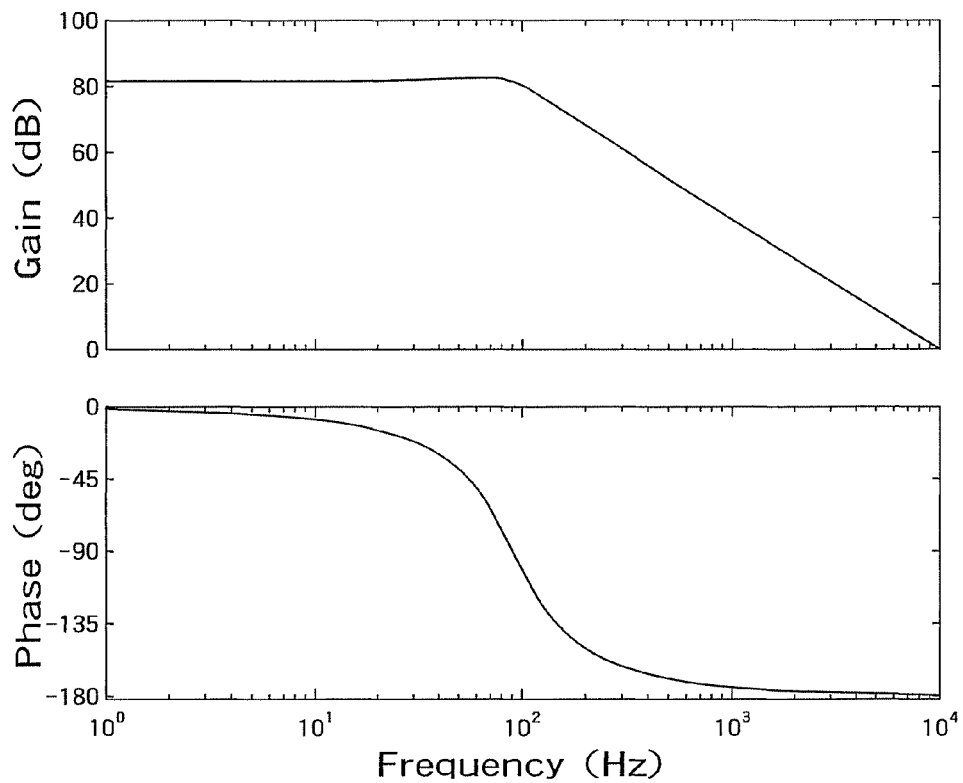
FIG. 5 shows frequency response of a controlled object model.

A controlled object model of a magnetic disk device is shown in Formula H, and frequency response of the controlled object model is shown in FIG. 5.

$$x[k+1] = \begin{bmatrix} 0 & 1 \\ -3.198 \cdot 10^5 & -565.5 \end{bmatrix} x[k] + \begin{bmatrix} 0 \\ 951.2 \end{bmatrix} u[k] \quad \text{[Formula H]}$$

$$y[k] = [\,3.937 \cdot 10^6 \quad 0\,] x[k]$$

Formula H is a second-order state space model having double integral characteristics in the vicinity of a controlled band.

An example of a PID controller that is designed for the controlled object model of Formula H is shown in Formula I.

$$C_{pid}(z) = \frac{71.99z^2 - 141.9z + 70}{1665(z^2 - z)} \quad \text{[Formula I]}$$

Figure 6:
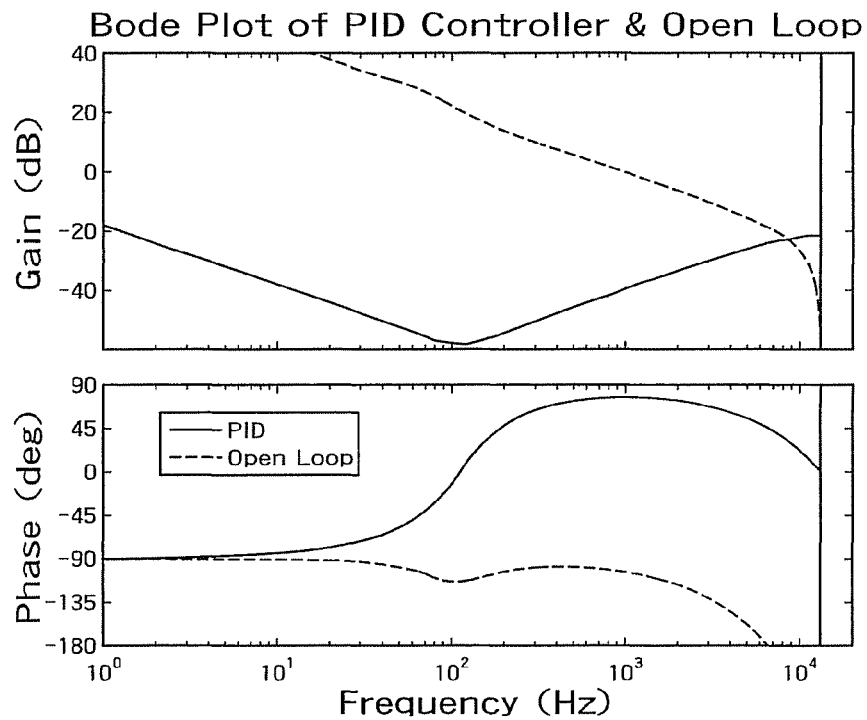
FIG. 6 shows frequency response of a PID controller and an open loop.

The PID controller of Formula I is designed based on a policy for setting the stability margin of a general head positioning control system. Frequency response and open-loop frequency response of the PID controller of Formula I are shown in FIG. 6.

According to the structure of the following control system shown in FIG. 1, the PID controller should have a structure that separates integral compensation from phase lead compensation. Thus, Formula I is decomposed into an integral element (a phase delay compensator) and a phase lead compensator, with reference to which a variable phase lead compensator represented by Formulas A to C is designed.

Figure 7:
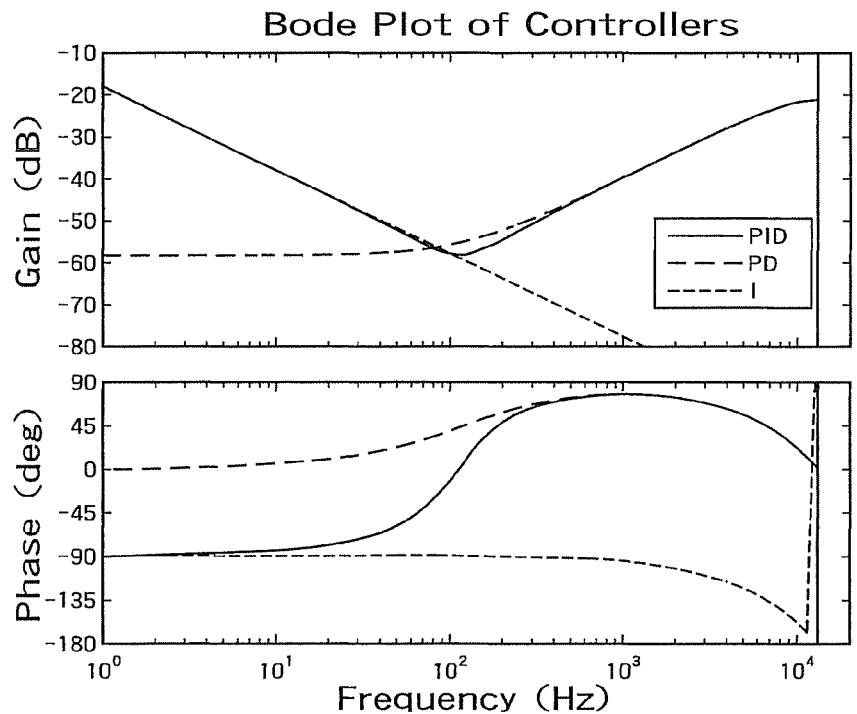
FIG. 7 shows frequency response of an integral element (a phase delay compensator) and a phase lead compensator.

Decomposition of Formula I into an integral element (or a phase delay compensator) $C_i(z)$ and a phase lead compensator $C_{pd}(z)$ results in Formula J. The frequency responses of the integral element (a phase delay compensator) $C_i(z)$ and the phase lead compensator $C_{pd}(z)$ are shown in FIG. 7.

$$C_i(z) = \frac{0.05}{1665(z-1)} \qquad \text{[Formula J]}$$

$$C_{pd}(z) = \frac{0.04324z - 0.04204}{z}$$

With respect to the phase lead compensator of Formula J thus obtained, the variable phase lead compensator (Formulas A to C) is designed.

Now, "$\underline{F}$" is determined as shown below if "$\underline{F}$" is selected such that open-loop characteristics resulting from state feedback control with $\rho=0$ and $\underline{F}$ are approximately equal to open-loop characteristics that are obtained with the phase lead compensator of Formula J:

$$\underline{F} = [4766.6 \ 6.2030] \qquad \text{[Formula K]}$$

Then, gain $K_f^f, K_f^p$ of the state estimator of Formula A is determined. This determination uses loop transfer recovery, which is a method of determining state estimator gain so that open-loop characteristics provided by state feedback control are preserved. $K_f^f, K_f^p$ that is set using loop transfer recovery is shown below:

$$K_f^f = [2.5397 \cdot 10^{-7} \ 1.3131 \cdot 10^{-2}]^T$$

$$K_f^p = [7.4599 \cdot 10^{-7} \ 1.2847 \cdot 10^{-2}]^T \qquad \text{[Formula L]}$$

Figure 8:
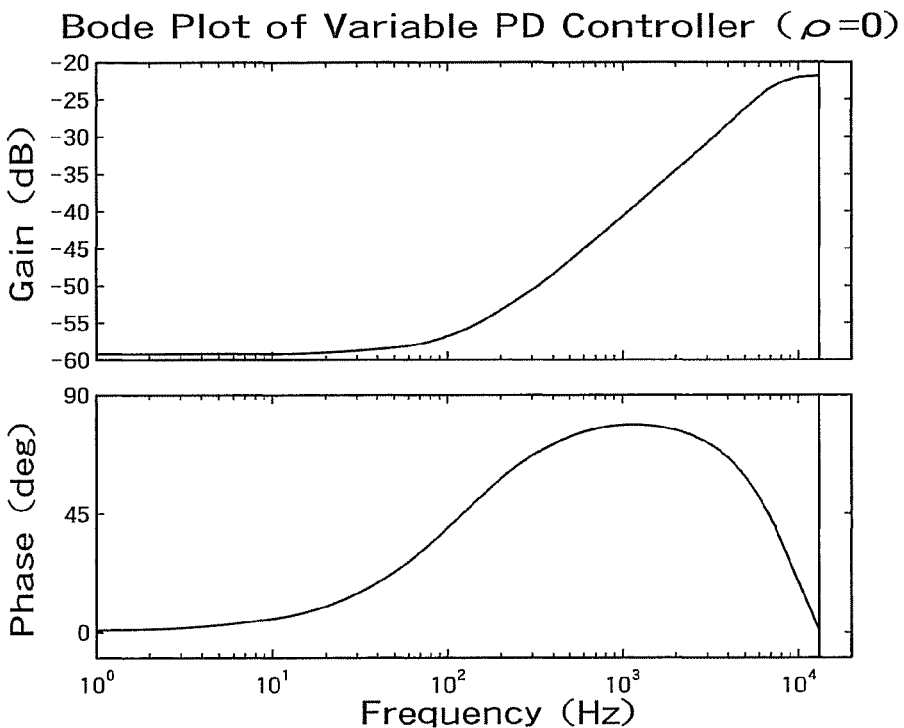
FIG. 8 shows characteristics of the variable phase lead compensator with $\rho=0$ in an embodiment of the invention.

With Formulas K and L substituted into Formulas A and B and when $\rho=0$, the frequency response of the variable phase lead compensator is determined as shown in FIG. 8.

Next, state feedback gain $\overline{F}$ for $\rho=1$ is designed. If "$\underline{F}$" designed previously is used as controller gain as of when a sensitivity function shape with increased suppression of high-frequency disturbance, such as the dotted-line one in FIG. 2(A), is obtained, $\overline{F}$ should be designed so as to be controller gain as of when a sensitivity function shape with increased suppression of low-frequency disturbance, such as the solid-line one in FIG. 2(A), is obtained.

Here, considering that the integral element (the phase delay compensator) and the phase lead compensator are separated from each other and the gain (integral gain) of the integral element (the phase delay compensator) is constant, gain (proportional gain) "F" of a portion corresponding to a proportional controller (a proportional element) of the phase lead compensator should be increased in order to lower the sensitivity in lower frequencies than the dotted-line sensitivity function shape. $\overline{F}$ that is designed from this viewpoint is shown below:

$$\overline{F} = [1.0329 \cdot 10^4 \ 6.2101] \qquad \text{[Formula M]}$$

Figure 9:
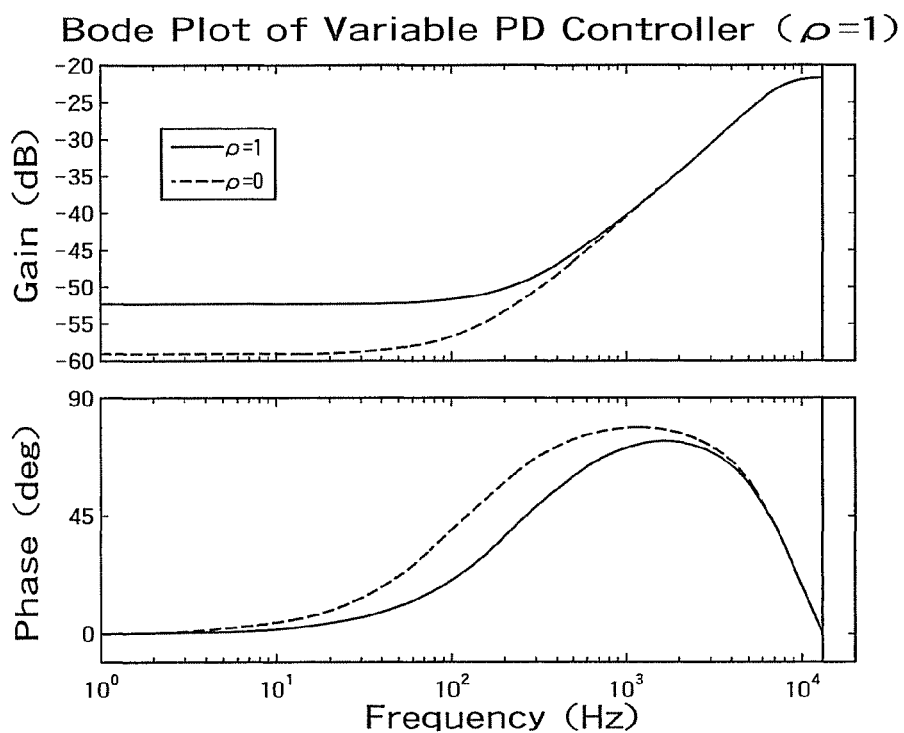
FIG. 9 shows characteristics of the variable phase lead compensator with $\rho=1$ in an embodiment of the invention.

The frequency response of the variable phase lead compensator ($\rho=1$) with the designed $\overline{F}$ substituted into Formulas A to C is shown in FIG. 9. For the state estimator gain $K_f^f, K_f^p$, Formula L is used as it is.

Figure 10:
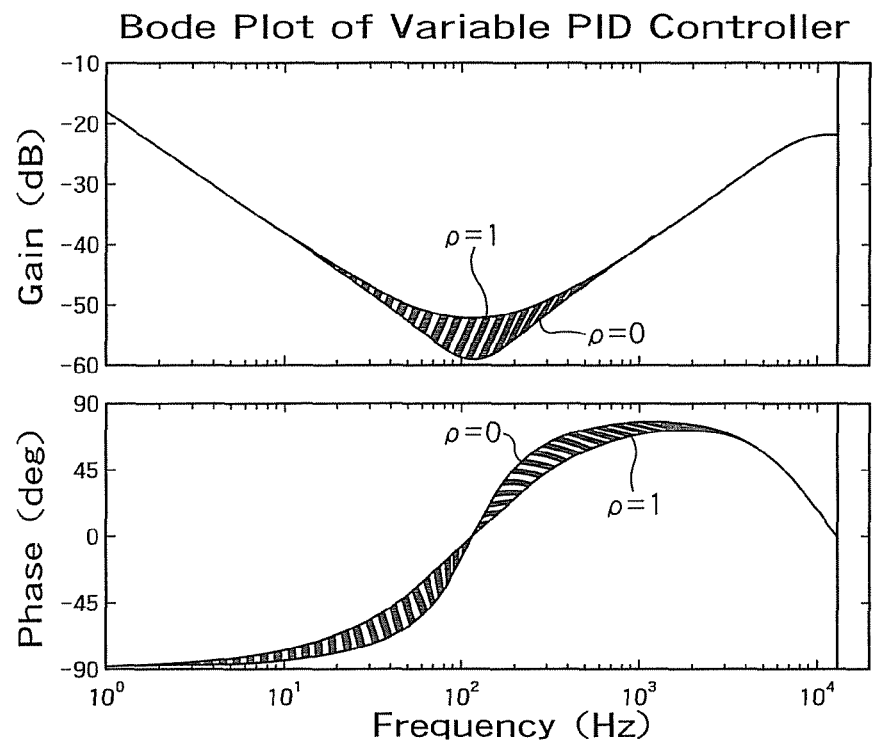
FIG. 10 shows variation of frequency response of a feedback controller according to an embodiment of the invention.
Figure 11:
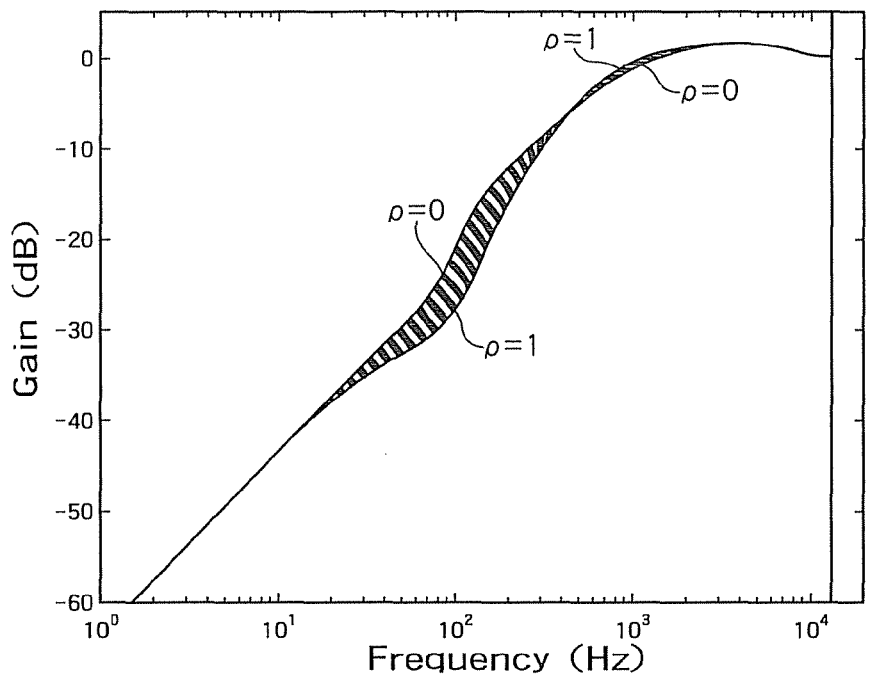
FIG. 11 shows variation of a sensitivity function according to an embodiment of the invention.

The sum of the variable phase lead compensator thus designed and the integral element (the phase delay compensator) of Formula J represents an example of the following controller pertaining to the present invention shown in FIG. 1. The variation width of frequency response of the feedback controller with $0 \leq \rho \leq 1$ is shown in FIG. 10, and a characteristic of the sensitivity function also with $0 \leq \rho \leq 1$ (i.e., the variation width of frequency response) is shown in FIG. 11. The plot of FIG. 11 is calculated based on the transfer function for a controlled object having the characteristics of FIG. 5 and the transfer function for a feedback controller having the characteristics of FIG. 10. In the feedback controller of the present embodiment, the sensitivity function continuously varies within the range shown by oblique lines in FIG. 11 through manipulation of proportional gain based on the value of the function "$\rho$".

Second Embodiment

Focusing on the variable phase lead compensator designed according to the first embodiment, it is understood that it has controller frequency response with the gain of a portion corresponding to the proportional controller (the proportional element) varying with "$\rho$". Based on this consideration, a variable phase lead compensator having a transfer function structure is described here as another configuration example of a variable phase lead compensator. An exemplary configuration of the variable phase lead compensator according to the present embodiment is shown in FIG. 12.

Figure 12:
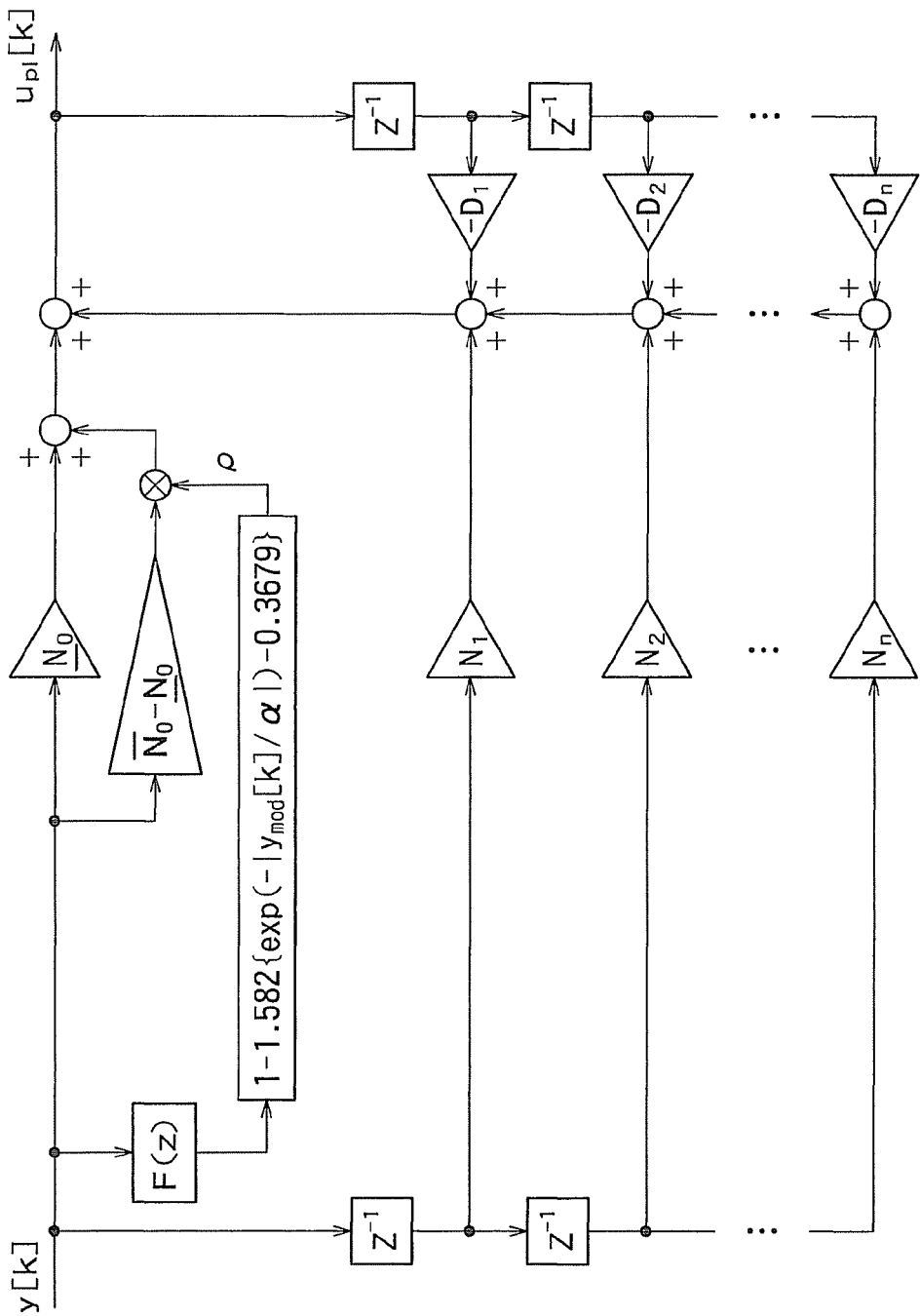
FIG. 12 is a block diagram of a variable phase lead compensator (transfer function type) and a function calculating unit according to an embodiment of the invention.

The transfer function, function "$\rho$", and control input of the variable phase lead compensator shown in FIG. 12 are shown in Formulas N, O, and P. Formula N shows an IIR-type transfer function.

1. Transfer Function $$C(z) = \frac{N_0 z^n + N_1 z^{n-1} + \ldots N_{n-1} z + N_n}{z^n + D_1 z^{n-1} + \ldots D_{n-1} z + D_n} \qquad \text{[Formula N]}$$

$$N_0 = \underline{N}_0 + \rho(\overline{N}_0 - \underline{N}_0)$$

2. Control Input $$u_{pl}[k] = C(z)y[k] \qquad \text{[Formula O]}$$

3. Function "$\rho$"

$$y_{mod}[k] = F(z)y[k]$$

$$\rho = 1 - 1.582\{\exp(-|y_{mod}[k]/\alpha|) - 0.3679\} \qquad \text{[Formula P]}$$

Formulas N to P can obtain frequency response similar to that shown in FIG. 9 by varying a maximum order coefficient "$N_0$" of a delay element in a numerator polynomial of the transfer function based on variation of "$\rho$" just as the variable phase lead compensator of state space type shown in Formulas A to C.

Figure 13:
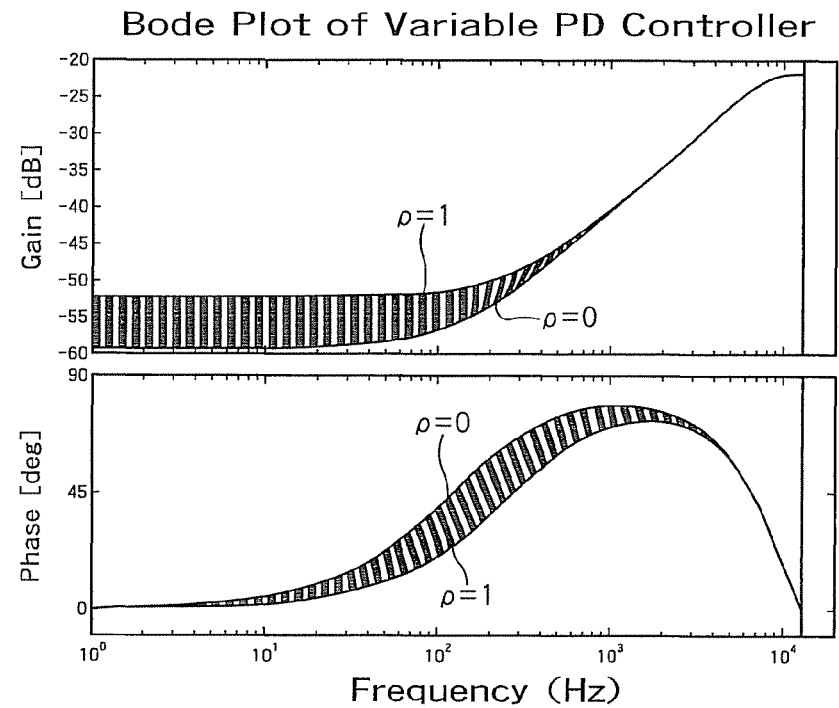
FIG. 13 shows variation of frequency response of the variable phase lead compensator (transfer function type) according to an embodiment of the invention.

The variation width of frequency response with the transfer function of Formula N being second order ($n=2$) and parameters selected as shown in Formula Q below is shown in FIG. 13. From FIG. 13, it is recognized that the gain (proportional gain) of a portion corresponding to the proportional controller of the phase lead compensator varies with change of "$\rho$".

$$N_0 = 0.042281 + \rho \cdot 0.0014798, N_1 = -0.041079, N_2 = 0$$

$$D_1 = 0.024438, D_2 = 0.066875 \qquad \text{[Formula A]}$$

The first and second embodiments of the feedback controller 301 have been thus far described.

In the following, the effectiveness of the present invention is demonstrated with computer simulation that uses a controlled object of a magnetic disk device and a mathematical model simulating disturbance signals. The mathematical model used here is one presented for a hard disk bench mark problem, which is created and published by a working group of the Institute of Electrical Engineers of Japan, Industrial Measurement Control Technical Committee (http://mizugaki.iis.u-tokyo.ac.jp/mss/benchmark.html).

The outline of the simulation is to apply, as a data sequence, signals that simulate various disturbances, such as torque noise, observation noise, flutter disturbance, and RRO disturbance, to a controlled object model and a positioning control system model that includes the designed feedback controller to evaluate the value of positioning accuracy 3σ ("σ" is standard deviation).

As the controlled object model, we prepared nine pattern models that take into consideration the resonance characteristic variation of head gimbal assemblies of the magnetic disk device and evaluated the stability and positioning accuracy of the control system for each of the models.

Figure 14:
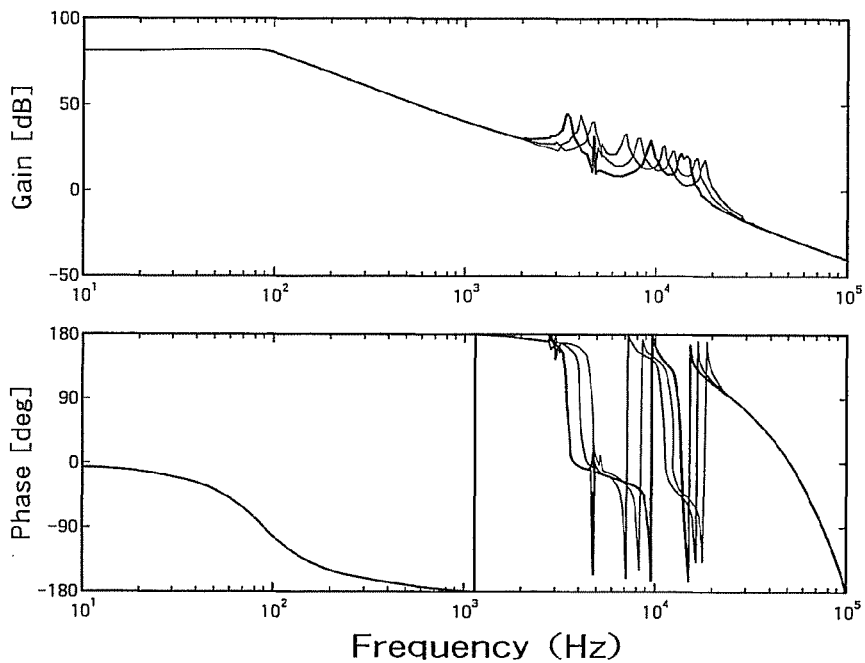
FIG. 14 shows a controlled object model that takes fluctuation into consideration.
Figure 15:
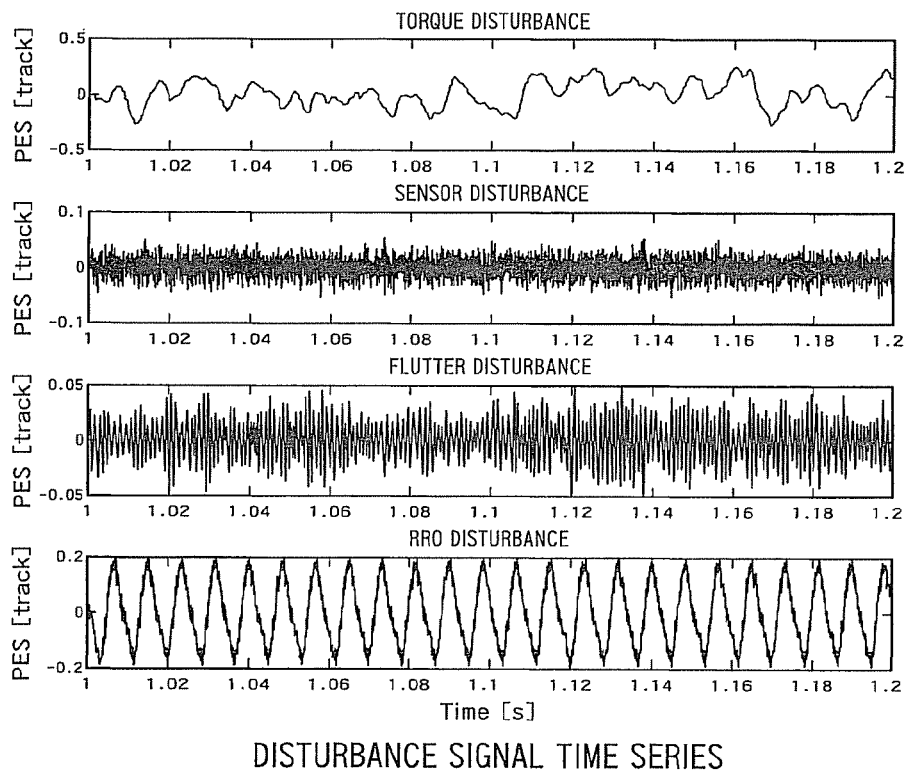
FIG. 15 shows an example of a disturbance signal time series.
Figure 16:
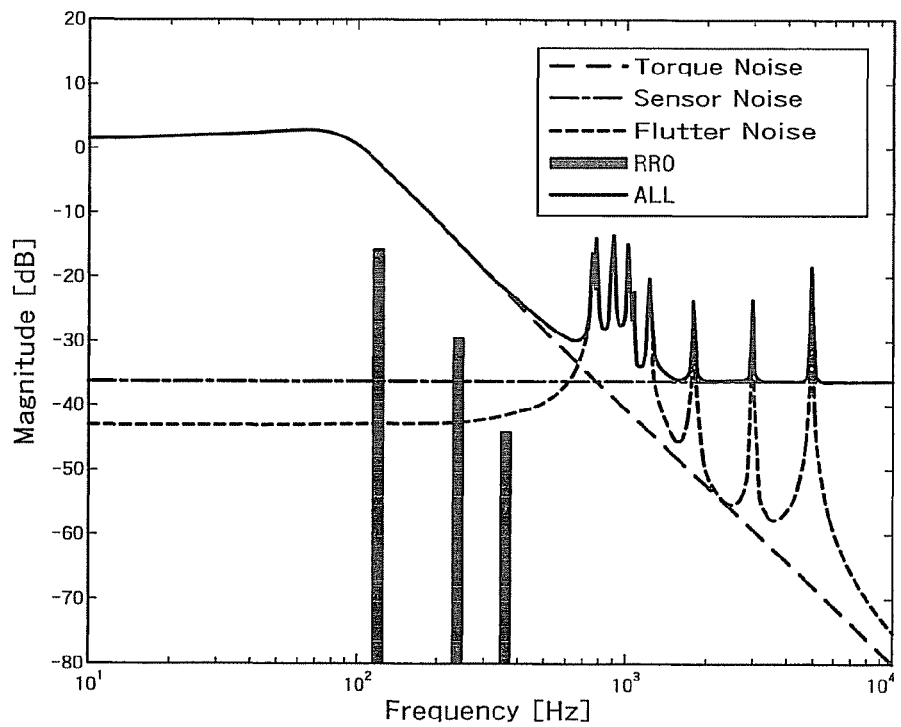
FIG. 16 shows an example of disturbance signal spectral distribution.

FIG. 14 shows the frequency response of the controlled object models of nine patterns, FIG. 15 shows time-series data for disturbance signals, and FIG. 16 shows spectral distribution of the disturbance signals and spectral distribution of the sum of those disturbance signals. In addition, a block diagram of the entire positioning control system simulation model to which input of the disturbances above is, added is shown as FIG. 17.

The simulation used the variable phase lead compensator 307 of state space type and the function calculating unit 306, which are represented by Formulas A to C shown in the first embodiment, and used $\underline{F}$, $\overline{F}$, $K_f^f$, $K_f^p$ of Formulas K to M as parameters. The value "α" in Formula C is a parameter for adjusting the variation width of "ρ" and is 0.085 here.

Figure 18:
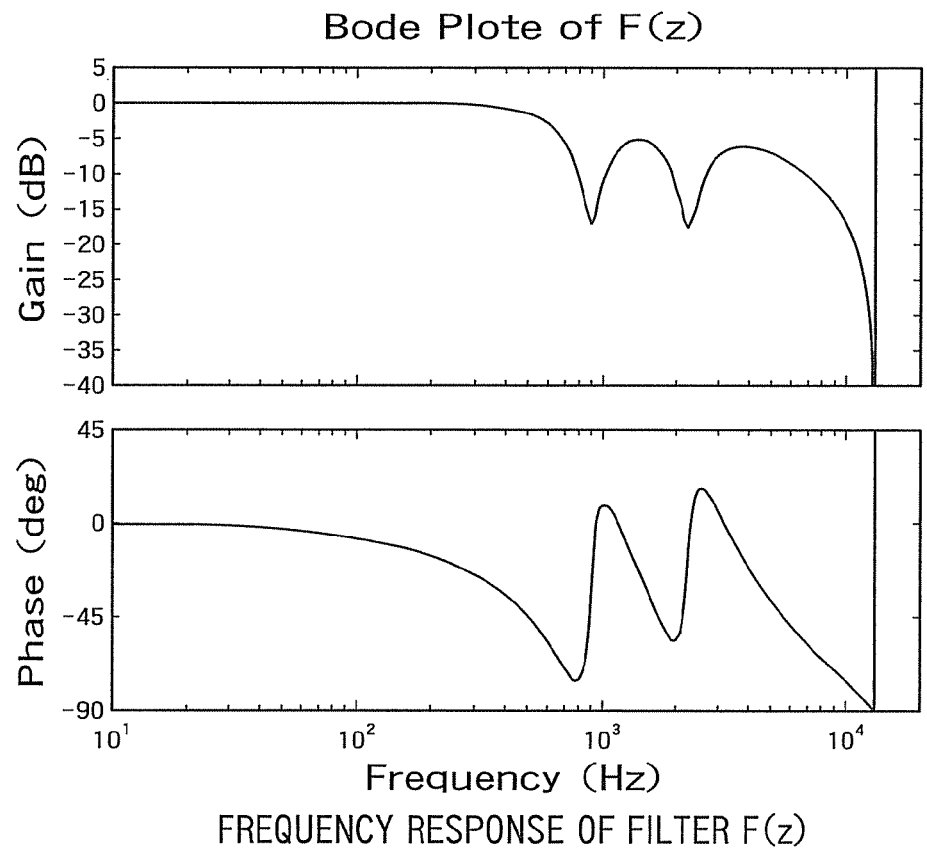
FIG. 18 shows frequency response of filter F(z) according to an embodiment of the invention.

As the filter F(z), we selected a filter represented by Formula R which uses a low-pass filter with cutoff frequency set to approximately 500[Hz] in combination with a notch filter having a peak at 1 to 2 [kHz] in order to prevent occurrence of ρ→1 when a position error amplitude is caused by flutter disturbance. FIG. 18 shows the frequency response of Formula R.

$$F(z) = \frac{0.2113z^5 - 0.5478z^4 + 0.3216z^3 + 0.3585z^2 - 0.5304z + 0.1918}{z^5 - 3.7058z^4 + 5.6136z^3 - 4.3330z^2 + 1.6948z - 0.2645}$$ [Formula R]

Figure 19:
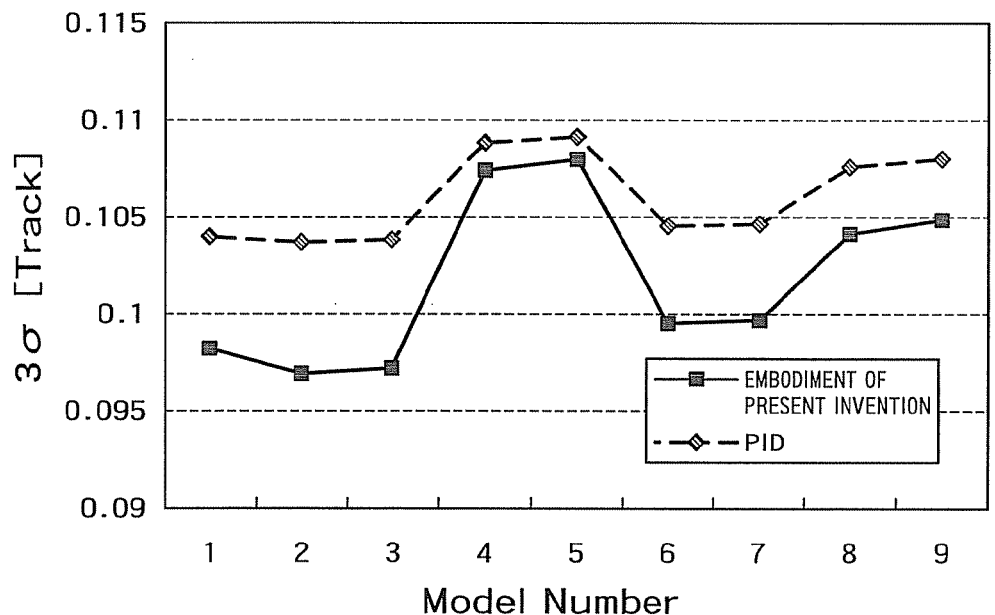
FIG. 19 illustrates a comparison of positioning accuracy between the present invention and a PID controller.

With such settings, we conducted positioning accuracy simulation with the feedback controller of the present invention and the PID controller shown in Formula 1 on the controlled object model of nine patterns. A plot created based on the result of the simulation is shown in FIG. 19. From FIG. 19, it is understood that the feedback controller according to the present invention has increased accuracy of positioning for all of the controlled object models as compared to the PID controller. Thus, the effectiveness of the present invention was proved through computer simulation.

As described above, according to the embodiments of the present invention, it is possible to improve positioning accuracy as compared with a conventional linear feedback controller.

What is claimed is:

1. A positioning control system, comprising:
a head moving unit configured to move a head for recording or reproducing information with respect to a disk capable of recording information;
a position detecting unit configured to detect a position of the head;
an error detecting unit configured to detect a position error signal of a detected head position with respect to a predetermined target position;
a compensation controller configured to generate control input by performing phase lead compensation and phase delay compensation for the position error signal and supply the control input to the head moving unit; and
a gain controller configured to control at least one of gains the phase lead compensation and the phase delay compensation based on frequency components contained in the position error signal and an amplitude of the position error signal, wherein
the gain controller has a bandpass filter for passing a predetermined band and controls the at least one of the gains according to the amplitude of a signal resulting from input of the position error signal to the bandpass filter, and
the gain controller
calculates a monotonically increasing function or a monotonically decreasing function which has a variable showing the amplitude of a signal resulting from the bandpass filter and has upper and lower limits, and
controls the at least one of the gains based on an output value of the monotonically increasing function or the monotonically decreasing function.

2. A positioning control system, comprising:
a head moving unit configured to move a head for recording or reproducing information with respect to a disk capable of recording information;
a position detecting unit configured to detect a position of the head;
an error detecting unit configured to detect a position error signal of a detected head position with respect to a predetermined target position;
a compensation controller configured to generate control input by performing phase lead compensation and phase delay compensation for the position error signal and supply the control input to the head moving unit; and
a gain controller configured to control at least one of gains the phase lead compensation and the phase delay compensation based on frequency components contained in the position error signal and an amplitude of the position error signal, wherein
the compensation controller has a state estimator which estimates a head speed based on the position error signal and control input that is generated through state feedback control,
the compensation controller performs the phase lead compensation through the state feedback control using the state estimator, and
the gain controller controls state feedback gain as the gain of the phase lead compensation.

3. The system according to claim 2, wherein
the state estimator is a filter-type state estimator that estimates a head speed at a certain sampling time based on the position error signal and the control input at the certain sampling time.

4. A positioning control system, comprising:
a head moving unit configured to move a head for recording or reproducing information with respect to a disk capable of recording information;
a position detecting unit configured to detect a position of the head;
an error detecting unit configured to detect a position error signal of a detected head position with respect to a predetermined target position;
a compensation controller configured to generate control input by performing phase lead compensation and phase delay compensation for the position error signal and supply the control input to the head moving unit; and
a gain controller configured to control at least one of gains the phase lead compensation and the phase delay compensation based on frequency components contained in the position error signal and an amplitude of the position error signal, wherein the compensation controller performs the phase lead compensation according to a certain IIR transfer function, and
the gain controller controls a maximum order coefficient of a delay element "z" in a numerator polynomial of the IIR transfer function as the gain of the phase lead compensation.

* * * * *